Feb. 5, 1952  C. A. SOUTHWICK, JR  2,584,633
CONTAINER WITH FUSED REINFORCED SEAM
Filed Nov. 9, 1945
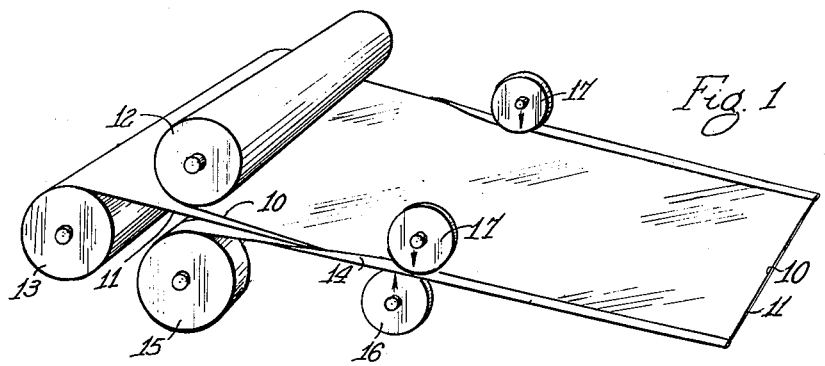
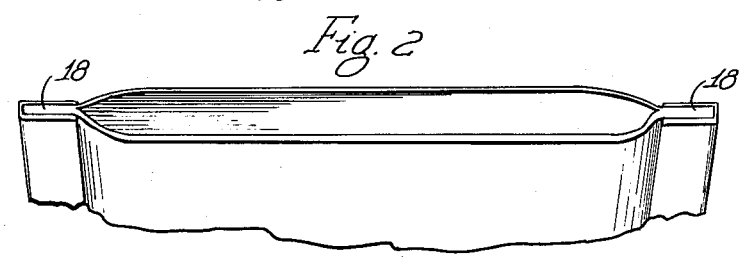
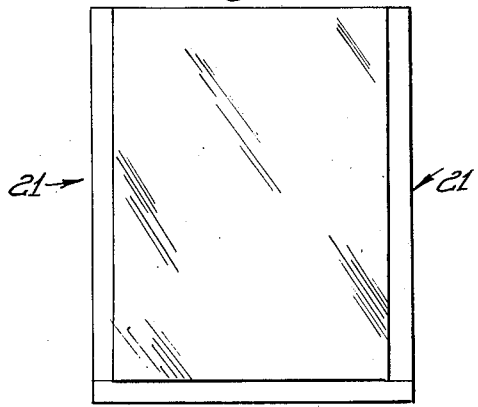
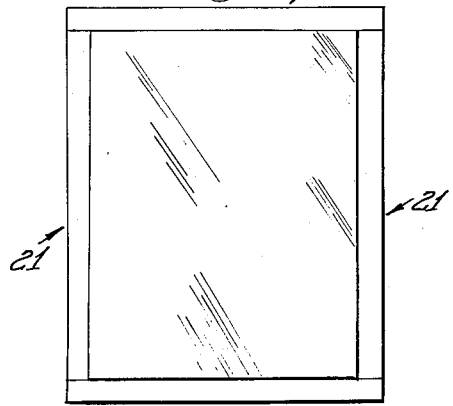
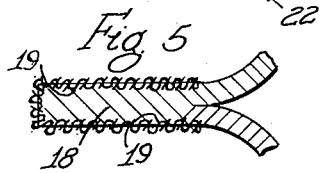
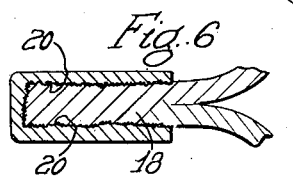
INVENTOR.
Charles A. Southwick, Jr.
BY
Cromwell, Greist & Warden
ATTORNEYS Patented Feb. 5, 1952

2,584,633

UNITED STATES PATENT OFFICE 2,584,633

CONTAINER WITH FUSED REINFORCED SEAM

Charles A. Southwick, Jr., Mount Vernon, Ohio, assignor, by mesne assignments, to Shellmar Products Corporation, Mount Vernon, Ohio, a corporation of Delaware Application November 9, 1945, Serial No. 627,644

4 Claims. (Cl. 206—46)

This invention relates to improvements in containers. More particularly, it pertains to the manufacture of bags, or pouches, made of highly heat-sensitive plastic materials having a novel type of reinforced seam construction.

Heretofore it has not been possible to seal heat-sensitive materials such as polyethylene, highly plastic vinyls, nylon sheetings, Koroseal, and the like, with sealing elements, because upon bringing heat and pressure into contact with superposed layers of such materials they fuse to the sealing surface and degrade.

It would be a distinct advantage to be able to provide pouches, or bags, of such materials because of the fact that they have high waterproof characteristics and some have moisture-vaporproof characteristics and this can now be accomplished by means of the present invention.

A principal object of the invention is the provision of a pouch, or bag, and a method for manufacturing the same, in which sheets of heat-sensitive plastic material, such as polyethylene or the like, have marginal portions thereof fused together into a unitary mass to provide a seam construction for the pouch with the remaining portions of each sheet providing pouch walls, and a binding and reinforcing tape or strip of fibrous material surrounding the seam construction with the fibers of the tape embedded within the plastic mass of the seam construction.

Other objects of the invention will in part be obvious and will in part appear hereinafter.

The invention accordingly comprises the several steps and the relation of one or more of such steps with respect to each of the others, and the product possessing the features, properties, and the relation of constituents, which are exemplified in the following detailed disclosure, and the scope of the application of which will be indicated in the claims.

For a fuller understanding of the nature and objects of the invention reference should be had to the following detailed description taken in connection with the accompanying drawing, in which:

Fig. 1 is a perspective view of a diagrammatic illustration of a means for securing together two such plastic webs by means of a binding tape along marginal portions thereof;

Fig. 2 is an enlarged view of a fragment of a bag, or a portion of a tube, such as that shown in Fig. 1 illustrating a reinforced seam construction;

Fig. 3 is a pouch, or bag, of plastic materials of the kind herein described formed from a tube of material in which the bottom is sealed together prior to filling the same;

Fig. 4 is a view similar to Fig. 3 illustrating a filled pouch sealed across the mouth opening;

Fig. 5 illustrates an enlarged section taken through a package, or pouch, marginal seam construction having a fabric material as a binding reinforcing tape; and Fig. 6 is a view similar to Fig. 5 illustrating a binding tape of a fibrous material such as paper.

Referring more particularly to the drawing there is illustrated in Fig. 1 a method of securing together two webs 10 and 11, for example, of material such as polyethylene running off mill rolls 12 and 13 respectively. Heretofore it has been impossible successfully to make a seam construction by directly contacting such plastics as polyethylene with heating elements. However, if plastic webs such as 10 and 11 are run in the form of a duplex sheet they can be sealed together marginally in tubular formation to provide bags, or pouches, by running them between a tape 14, folded over and around the webs 10 and 11. The tape can be passed from a mill roll 15 positioned as illustrated. Any suitable form of mechanism through which the tape passes to be folded as shown can be used but this is not shown in the drawing since such a device is not part of the invention.

When the tape is placed around the marginal edges of the webs 10 and 11, and continuously run along therewith it passes between heating elements, such as rollers 16 and 17, which are under pressure. Such rollers conveniently can be disposed on opposite sides of the web in a suitable machine or standard for supporting them. Obviously, one set of rollers could be utilized in sealing together one marginal edge of a duplex web. Preferably, both marginal edges should be fused together simultaneously, to provide a tubular formation which can be continuously wound into roll form and tubes cut to provide pouches as they are needed. On the other hand, the tube lengths can be severed as the continuous running web emerges from between the heating elements 16 and 17.

The folded over tape 14 preferably consists of a fibrous material and may be either a suitable kraft paper of loosely compacted fibers or a fabric material such as loosely woven cloth. Because of the fact that such a tape surrounds the marginal edges of the webs and acts as an insulator between the sealing rollers 16 and 17, no disintegration occurs to the plastic material during the formation of the seam construction. On the contrary, the webs 10 and 11, where they are in marginal face-to-face contact, are sufficiently heated so as to autogenously bond them together into a unitary mass as indicated generally in the drawings at 18 (Figs. 2, 5 and 6). The folded over tape 14, in addition to functioning as an insulating barrier, becomes a binding and reinforcing member and constitutes part of the ultimate seam construction. For example, as shown in Fig. 5, the fabric material is deeply embedded in the plastic mass 18 as indicated at 19, to the extent that the plastic mass approximately reaches the outer surface of the fabric material. In this manner the strands of the fabric interlockingly are engaged by the plastic when it is fused into position and upon cooling forms a firm and durable seam construction.

In Fig. 6 the loosely compacted fibers of the kraft paper are not penetrated by the plastic mass 18 but they are deeply impregnated as at 20, 20.

Whether a duplex web so constructed is wound into a mill rool and tube lengths subsequently cut therefrom, or whether the tube lengths are cut immediately after the web emerges from between the sealing rollers, tubular formations will be provided with side seams constructions indicated generally at 21 and it is but necessary to complete the tubular construction to provide a bag by sealing one end of the tube in a similar, or any other suitable manner, to provide, for example, a bottom seam construction indicated generally at 22.

A pouch, or a bag, which will result from the foregoing procedure is illustrated in Fig. 3. After such a pouch has been filled, it again is sealed across the mouth opening in a similar, or any other suitable manner, as indicated, for example, at 23.

It will thus be seen that the objects hereinbefore set forth may readily and efficiently be attained, and since certain changes in carrying out the above process, and certain modifications in the article which embody the invention may be made without departing from its scope, it is intended that all matter contained in the above description or shown in the accompanying drawing shall be interpreted as illustrative and not in a limiting sense.

It is also to be understood that the following claims are intended to cover all of the generic and specific features of the invention herein described, and all statements of the scope of the invention which, as a matter of language, might be said to fall therebetween.

Having described my invention, what I claim as new and desire to secure by Letters Patent is:

1. A pouch of the character described which comprises superposed sheets of polyethylene, marginal portions of said sheets being fused together into a unitary mass to provide a seam construction for said pouch with the remaining portions of each sheet providing pouch walls, and a binding and reinforcing strip of fibrous material extending from one side to the other of said polyethylene seam construction and surrounding the same with the fibers of said material embedded within said mass of polyethylene on each side of the pouch.

2. A pouch of the character defined in claim 1, and wherein said fibrous material is composed of loosely woven fabric.

3. A pouch as defined in claim 1, and wherein said fibrous material is composed of paper material.

4. An hermetically sealed package comprising sheets of superposed polyethylene plastic, marginal portions of said polyethylene being fused together into a unitary mass to provide a pouch having polyethylene walls and side and bottom seam constructions, a binding and reinforcing strip of fibrous material extending from one side to the other of said seam construction and extending around said side and bottom seam construction with the fibers of said material embedded within said mass in the polyethylene sheets on each side of the pouch, a commodity within said pouch, and a marginal filling closure seam construction constituting a fused unitary mass of said polyethylene, with a fibrous binding and reinforcing strip embedded therein on opposite sides of the pouch, said strip extending from one side to the other of said closure seam.

CHARLES A. SOUTHWICK, Jr.

REFERENCES CITED

The following references are of record in the file of this patent:

UNITED STATES PATENTS

| Number | Name | Date |
|---|---|---|
| 1,909,683 | Jonas | May 16, 1933 |
| 2,000,989 | Royal | May 14, 1935 |
| 2,053,085 | Hunter | Sept. 1, 1936 |
| 2,090,308 | Potdevin | Aug. 17, 1937 |
| 2,232,640 | Schwartzman | Feb. 18, 1941 |
| 2,237,344 | Evans | Apr. 8, 1941 |
| 2,244,282 | Bergstein | June 3, 1941 |
| 2,322,654 | Moore | June 22, 1943 |
| 2,373,010 | Brady | Apr. 3, 1945 |
| 2,395,077 | Southwick, Jr. | Feb. 19, 1946 |
| 2,396,437 | Richens | Mar. 12, 1946 |
| 2,488,212 | Lloyd | Nov. 15, 1949 |

FOREIGN PATENTS

| Number | Country | Date |
|---|---|---|
| 567,360 | Great Britain | Feb. 12, 1945 |

OTHER REFERENCES

Hoyler: "An Electronic Sewing Machine," reprint from August 1943 issue of Electronics.

Polyethylene Resins, published by Bakelite Corp., 1944.